United States Patent [19]

Kraatz et al.

[11] Patent Number: 4,778,731
[45] Date of Patent: Oct. 18, 1988

[54] OPTICALLY TRANSPARENT ELECTRICALLY CONDUCTIVE SEMICONDUCTOR WINDOWS AND METHODS OF MANUFACTURE

[75] Inventors: Paul Kraatz, Redondo Beach; James M. Rowe, Torrance; John W. Tully; Vahram W. Biricik, both of Palos Verdes Estates; Wesley J. Thompson, Torrance; Rudolph W. Modster, Los Angeles, all of Calif.

[73] Assignee: Northrop Corporation, Hawthorne, Calif.

[21] Appl. No.: 14,326

[22] Filed: Feb. 13, 1987

[51] Int. Cl.⁴ .................. B32B 15/04; G02B 5/22
[52] U.S. Cl. ......................... 428/623; 428/632; 428/633; 428/639; 428/641; 428/642; 350/1.1; 350/1.6; 350/164
[58] Field of Search ............ 350/1.1, 1.6, 164, 166; 428/623, 632, 633, 639, 641, 642

[56] References Cited

U.S. PATENT DOCUMENTS 4,058,638 11/1977 Morton .................. 350/164

Primary Examiner—L. Dewayne Rutledge
Assistant Examiner—George Wyszomierski
Attorney, Agent, or Firm—Terry J. Anderson; Robert B. Block

[57] ABSTRACT

A semiconductor window which is transparent to light in the infrared range and which has good electrical conductivity is formed with a substrate of semi-conductor material which has a conduction modifying dopant diffused, grown or deposited on one surface thereof to a substantial depth so that a layer thereof exhibits reduced resistance to a value below 10 ohms/square. Anti-reflection dielectric layers are stacked on both outer surfaces thereof. The dielectric substrate may be of silicon, germanium or gallium arsenide depending on the transparency bandwidth of interest. The thickness of the substrate and the doping of the surface thereof is closely controlled to obtain both low electrical resistivity and high optical transmissivity.

16 Claims, 4 Drawing Sheets

OPTICALLY TRANSPARENT ELECTRICALLY CONDUCTIVE SEMICONDUCTOR WINDOWS AND METHODS OF MANUFACTURE

BACKGROUND OF THE INVENTION

This invention relates to transparent, electrically conductive semiconductor windows and more particularly such windows which are made of treated semiconductor materials, which are transparent in the infrared spectrum, and which have good electrical conductivity.

Transparent conductive windows through which optical energy must pass and which have good electrical conductivity have utility in a number of applications. These include resistance heated windows, electro magnetic interference (EMI) shielded windows, antistatic windows and transparent electrodes for use in windows. In co-pending application Ser. No. 883,897 filed July 9, 1986, entitled TRANSPARENT CONDUCTIVE WINDOWS, COATINGS, AND METHOD OF MANUFACTURE and assigned to Northrop Corporation, the assignee of the present application, transparent conductive windows, coatings and their method of manufacture are described which employ thin conductive metal layers which are sandwiched between dielectric matching layers. The devices of this prior application afford both good electrical conductivity and transmissivity in the infrared and ultra violet ranges.

The device of the present invention affords a number of advantages over that of the aforementioned prior application. These include the capability of providing transmissivity over a greater band width; higher transmissivity for optical waves having angles of incidence away from the normal; greater mechanical durability; and greater ease and economy of fabrication.

Other known applicable prior art devices are discussed by J. L. Vossen in an article on transparent conducting films which appeared in *Physics of Thin Films,* Volume 9, published in 1977 by Academic Press. In this article, the use of semiconductor oxides forming transparent conductive films is discussed. It has been found, however, that semiconductor oxide substrates exhibit the shortcomings of low carrier life time, resistivity which is higher than to be desired and relatively low optical transmissivity particularly in the infrared range, as compared with the devices of the present invention.

OBJECTS AND SUMMARY OF THE INVENTION

It is a general object of the present invention to provide a transparent, conductive window made of semiconductor material.

It is an object of this invention to provide a semi-conductor window having high optical transmittance in the infrared range and low sheet resistance.

It is a further object of this invention to provide a semi-conductor window in the infrared range having low sheet resistance and a wider optical band width.

It is still another object of this invention to provide an improved semiconductor window for the infrared range having low sheet resistance which has higher mechanical durability.

It is another object of this invention to provide a semi-conductor window of good transmissivity in the infrared range and of low electrical sheet resistance which is easier and more economical to fabricate.

It is still a further object of this invention to provide a semiconductor window having low sheet resistance which has higher transmissivity to optical waves which depart from a normal angle of incidence.

The device of the invention comprises a semiconductor substrate which in one embodiment is silicon, in another embodiment germanium, and in a third embodiment, gallium arsenide. In the embodiments employing germanium and silicon substrates, the substrates are doped with an N type dopant element which diffuses into the substrate surface, leaving its optical constants essentially unchanged. The dopant is diffused to greater depths than are commonly employed in other technologies and its concentration, distribution, and depth of diffusion are closely controlled to effect optimum optical transmittance and low electrical resistivity. The dopant may be applied to the substrate surface by a variety of means, depending upon the chemistries of the substrate and dopant and their responses to various ambient environmental conditions. The dopant may be deposited on the substrate surface from an inert gas carrier in a controlled atmosphere in a furnace, for example. It may be deposited on the substrate surface from a liquid solution, suspension, or slurry, by spinning or spraying, and preconditioned by thermal treatment in a controlled atmosphere. It may be deposited in vacuum by various means, including evaporation from an electron beam or thermal source, sputtering in dc, rf, or magnetron-supported discharge, or combinations thereof, ion beam sputtering, molecular beam epitaxy, or variants thereof, and ion implantation. It may also be deposited on the substrate surface by reactants in the vapor phase (i.e., chemical vapor deposition) at, above, or below atmospheric pressure. However applied, dopant may be diffused into the surface of the substrate at elevated temperatures (600°–1200° C.). A series of dielectric antireflection stacks are then deposited on both of the opposite surfaces of the substrate to minimize the reflectivity of such surfaces.

In the case of the embodiment employing a gallium arsenide substrate, a gallium arsenide film is epitaxially deposited on the substrate along with a dopant such as silicon to produce a thin film window having an exceptionally wide band pass in the infrared range (1–16 microns). A similar, doped semiconductor film may be deposited on a silicon or germanium substrate, by homoepitaxy or heteroepitaxy. Examples of homoepitaxy include, but are not limited to, doped silicon on silicon and doped germanium on germanium; i.e., the deposited layer is, in essence, chemically identical to the substrate host, with the addition of a trace amount of a dopant species. Examples of heteroepitaxy include, but are not limited to, gallium arsenide on germanium and aluminum nitride on silicon; i.e., the deposited layer is chemically different, but structurally similar to the substrate host, on an atomic scale. In addition, similarities in chemical bond type and coefficient of thermal expansion are required between substrate host and deposited layer for the occurrence of heteroepitaxy. A series or "stack" of dielectric antireflection coatings is then deposited on the doped and undoped surfaces of any of the substrates employed.

As used herein, the term "doped" means establishing an impurity concentration in a semiconductor by diffusion, epitaxial deposition, or other means.

DESCRIPTION OF THE PREFERRED EMBODIMENT

Figure 1:
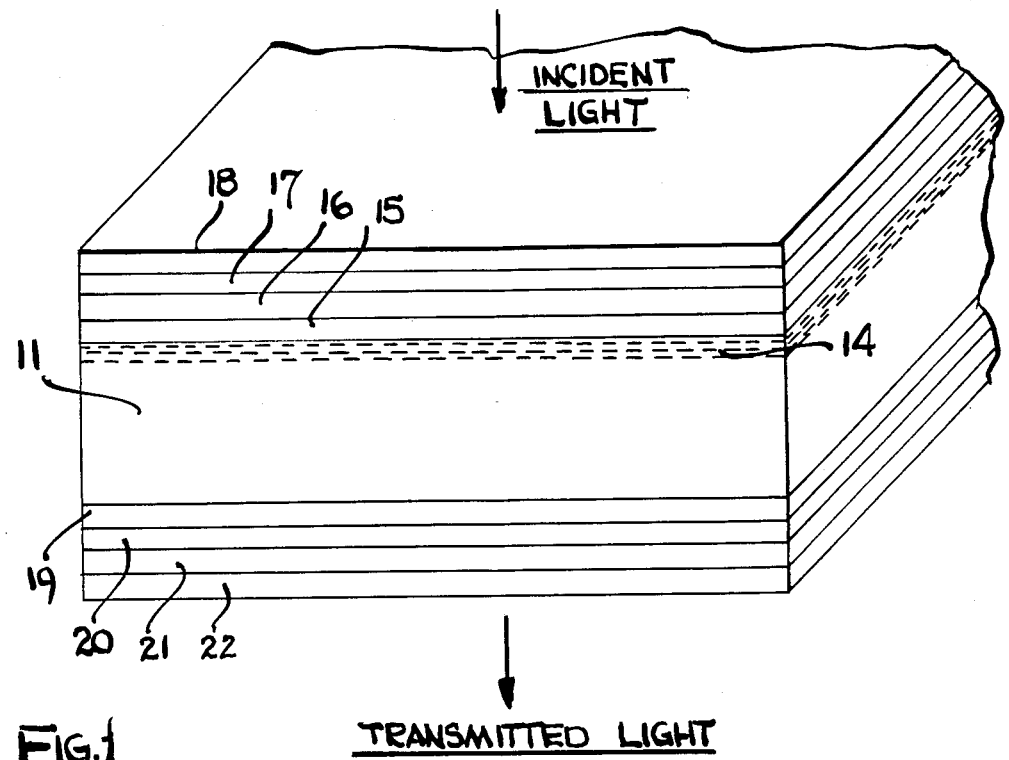
FIG. 1 is a schematic drawing illustrating the structure of the first and second embodiments of the invention.

Referring now to FIG. 1, the first and second embodiments of the invention are schematically illustrated. The first embodiment employs a semiconductor substrate 11 of silicon while in the second embodiment the substrate is of germanium. The thickness of the substrate is not critical but should be sufficient to make for a structurally self supporting unit and may typically be of the order of 0.015–0.050 inches. Thicker substrates, e.g. 0.5 to 1.0 inches, could also be employed. Such a self supporting unit is called for in view of the fact that adherents presently available which could be used to attach the substrate to a supporting optical window do not have good optical transmittance in the infrared spectrum. With the discovery of adherents with the proper optical characteristics, a supporting window might be employed. A doped semiconductor layer 14 which may be of phosphorous, arsenic or antimony for either substrate is vacuum deposited or carried to the surface of the substrate in an inert gaseous or liquid medium, and diffused into the substrate to a considerably greater depth than in the prior art. The doped layer is diffused to depths between 15 and 50 microns and in the preferred embodiments is of the order of 25 microns thick. The dopant is preferably of the N type and leaves the optical constants of the substrate substantially unaltered when compared with undoped material. N type dopant is preferred over P type dopant in view of the fact that at the same level of electrical conductivity N type dopant results in less optical absorption than P type, thus enhancing optical transmission.

Layered over doped layer 14 are a plurality of dielectric layers 15–18 which are typically thermally evaporated on by techniques well known in the art to form an anti-reflection stack. These layers are typically of a material such as germanium or zinc sulfide and have thicknesses of the order of 0.3 microns. Similar dielectric anti-reflection layers 19–22 are deposited on the bottom surface of substrate 11. The materials employed for these anti-reflection layers and the thicknesses of the deposition thereof are chosen for optimum anti-reflection characteristics for each particular embodiment.

Figure 2:
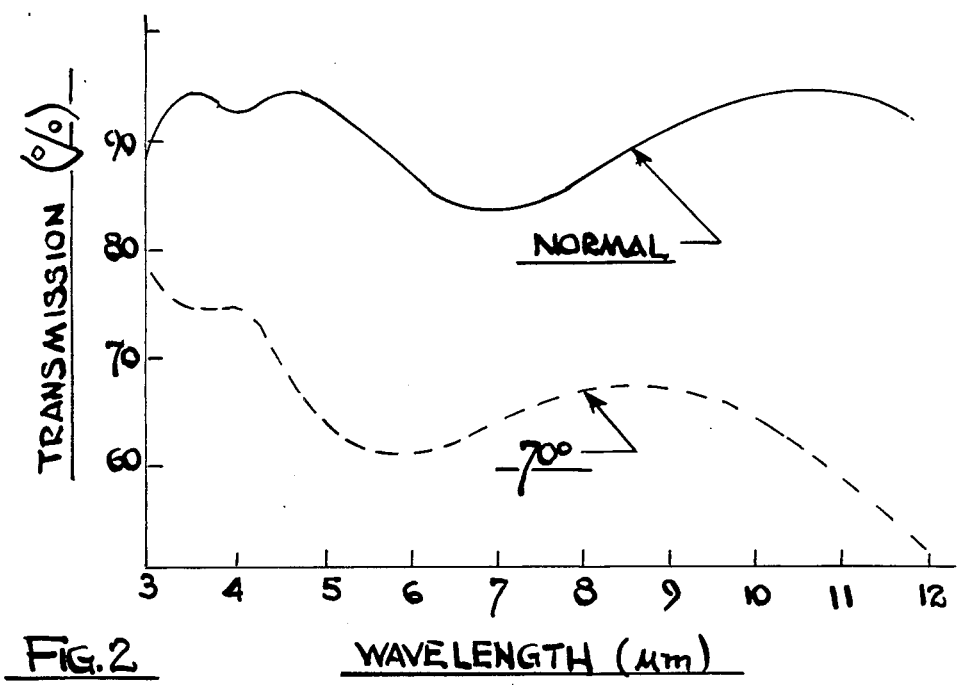
FIG. 2 is a graph illustrating the transmission characteristics of the first embodiment.

The characteristics of the embodiment of the invention having a germanium substrate are shown in FIG. 2. This embodiment has a sheet resistivity of 5 ohms/square. As can be seen from the graph, between 85% and 95% transmittance is provided in the infrared spectrum between three and twelve microns for light with a normal angle of incidence. With a 70 degree angle of incidence over this same range transmittance varies between about 55% and 78%.

SILICON SUBSTRATE

Figure 3:
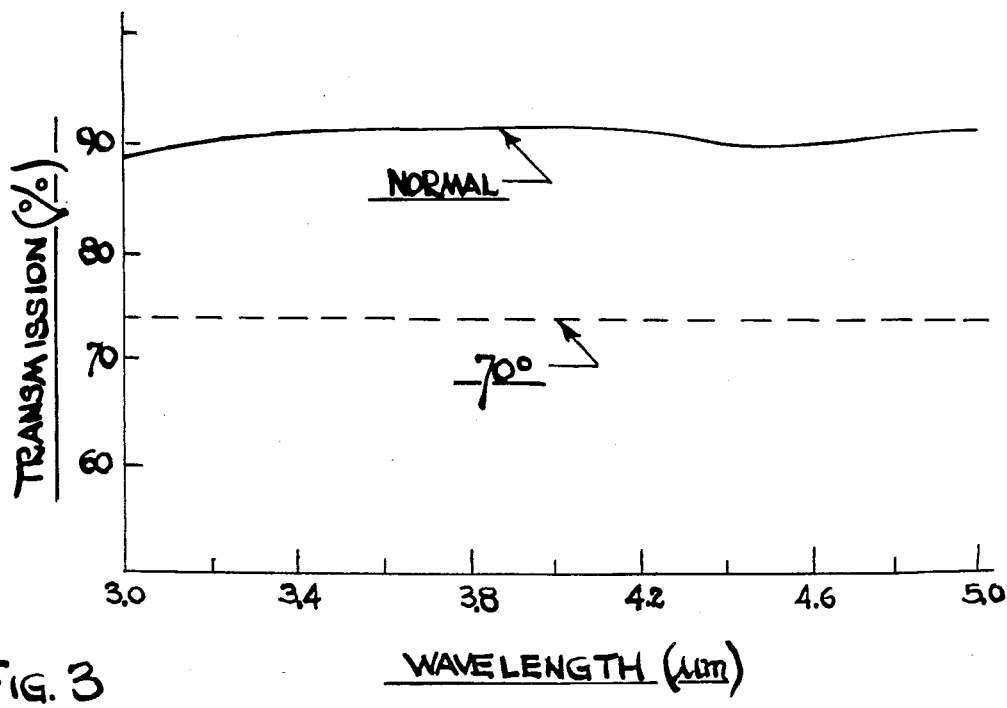
FIG. 3 is a graph illustrating the transmission characteristics of the second embodiment.

Referring now to FIG. 3, the characteristics of an embodiment of the invention with a silicon substrate, as described further on in the specification, is shown. For this embodiment, sheet resistance is 5 ohms/square and as can be seen from the figure, transmittance is 90% for light waves between 3 and 5 microns having a normal angle of incidence. As further shown, for an angle of incidence of 70 degrees over the same wave length band, transmittance is about 75%.

Figure 4:
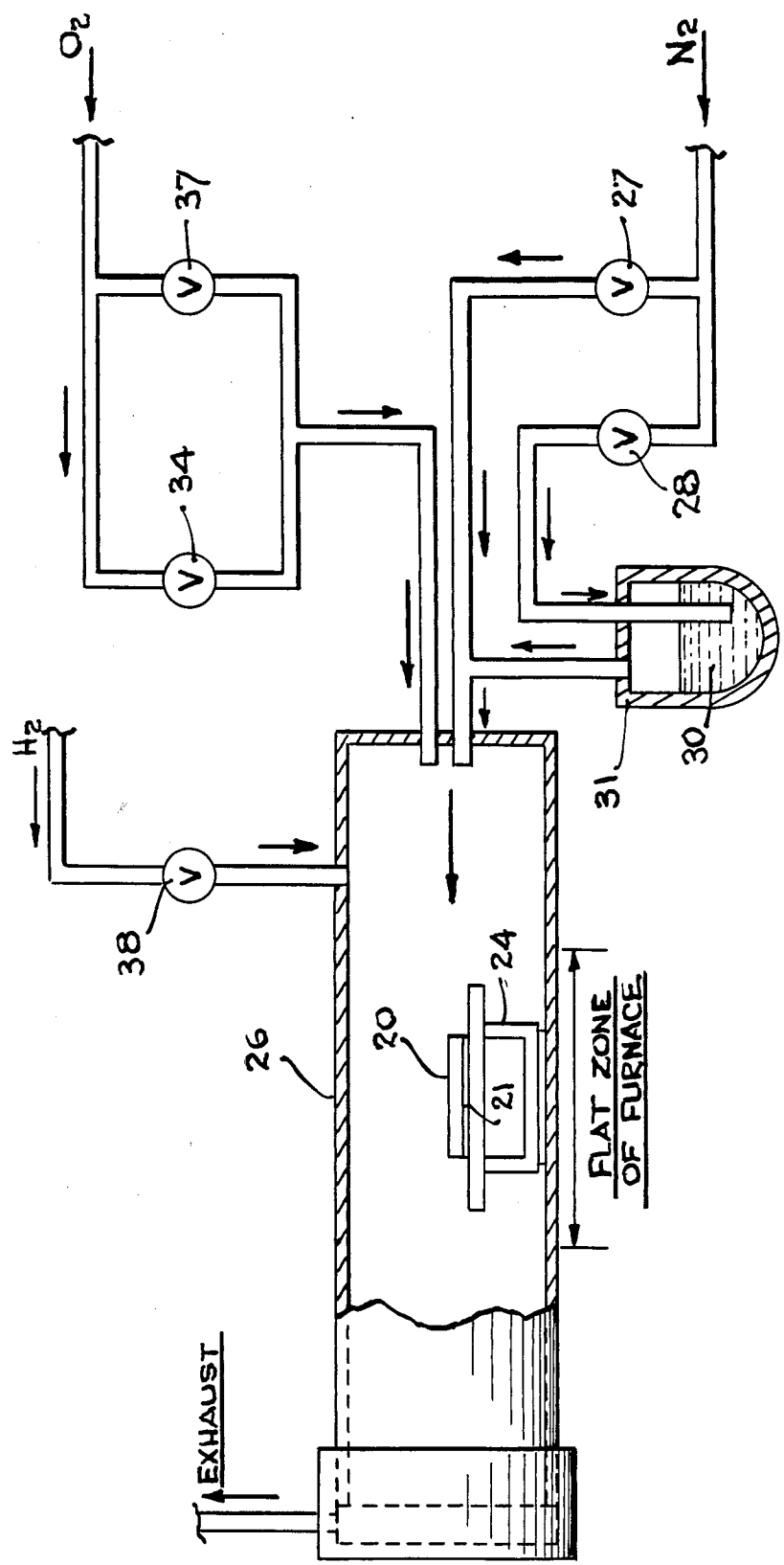
FIG. 4 is a schematic drawing illustrating the fabrication of the first embodiment.

Referring now to FIG. 4, equipment utilized to fabricate an embodiment of the invention with a silicon substrate is shown, and the method for fabricating this embodiment utilizing this equipment will now be described in connection with this Figure.

EXAMPLE I (Silicon Substrate)

A silicon wafer 20 having a thickness of 0.015 inches has its bottom surface coated with a silicon dioxide coating 21 to a thickness of 1 micron. The silicon dioxide coating is used to provide a barrier layer impervious to the dopant species thus protecting the bottom surface from contact therewith. This silicon dioxide layer can be deposited by any conventional techniques such as sputtering, evaporation or spin coating by conventional techniques well known in the art and is done prior to the placement of the substrate in the furnace 26. Also, in order to remove any residual native oxide from the silicon surface to be doped, after the silicon dioxide layer has been deposited, the substrate is dipped in cold dilute hydrofluoric acid, 10% by volume, for about thirty seconds and then rinsed in deionized water and blown dry with nitrogen immediately prior to insertion in the furnace. This last mentioned step is necessary to prevent any residual oxide on the silicon surface from acting as a barrier to the diffusion of the phosphorous to be used as a dopant. This light etching will not remove an appreciable amount of the silicon dioxide deposited on the lower surface of the substrate. Prior to the insertion of the substrate in the furnace, the furnace temperature is set at 950° C. with valve 27 open and the remaining valves closed to permit the flow of nitrogen gas into the furnace at a rate of 2000 cc/min. The substrate 20 is then placed on quartz boat 24 which is mounted in the flat zone of the quartz lined furnace 26. The flow of nitrogen at 2000 cc/min through valve 27 into the furnace is continued for a period of five minutes to permit thermal equilibration of the substrate 20 while purging the substrate surface.

When the temperature of the substrate 20 has equilibrated at 950° C., valve 28 is opened (valve 27 is left open) and nitrogen is flowed at a rate of 40 cc/min through liquid phosphorous oxychloride 30 contained within bubbler flask 31 for a period of 5 minutes to effectively purge the bubbler system. After the bubbler system has been purged by the nitrogen, valve 34 is opened and oxygen flowed into furnace 26 at a rate of 60 cc/min. Valve 28 is left open to effect the feeding of evaporated phosphorous oxychloride into furnace 26 on a nitrogen carrier. The oxygen reacts with the phosphorous oxychloride vapor fed into the furnace from flask 31 to form a phosphate glass on the surface of substrate 20. This deposition process is continued for a period of twenty minutes. At the end of this period, valves 28 and 34 are closed and valve 27 is opened to permit the flow of nitrogen into the furnace for five minutes to purge the furnace.

At the end of this five minute period, valve 27 is closed and the doped substrate removed from the furnace and its surface resistance measured using a four point probe or other convenient device. Typically the resistance so measured is about four times the surface resistance of the doped silicon substrate after the diffusion step. Thus, a silicon surface with phosphate glass measuring 20 ohms/square will yield a silicon surface measuring 5 ohms/square after diffusion has been completed in a following step. If the resistance is too high the silicon substrate is returned to the furnace and the phosphorous oxychloride deposition continued for a period to lower the resistance to the desired point. It is to be noted in this regard that resistance decreases as the concentration of the dopant layer increases.

The furnace is then heated to a temperature of 1150° C. and the doped substrate placed back in the furnace on the quartz boat and valve 27 opened to permit a flow of nitrogen into the furnace at a rate of 1500 cc/min. After sufficient time (five minutes) has elapsed to permit thermal equilibration of the doped substrate, valve 37 is opened to permit a flow of oxygen into the furnace at a rate of 1600 cc/min, with nitrogen continuing to be supplied to the furnace through valve 27 but with the rate of flow reduced to 50 cc/min. Valve 38 is also opened to permit a flow of hydrogen into the furnace at a rate of 2600 cc/min. The flow of oxygen at 1600 cc/min through valve 37, hydrogen at 2600 cc/min through valve 38 and nitrogen at 50 cc/min through valve 27 is continued for thirty minutes to produce a native oxide coating on the dopant surface having a thickness of 5000 angstroms. At the end of this thirty minute period, valves 37 and 38 are closed to shut off the oxygen and hydrogen supplied to the furnace and valve 27 is adjusted to provide a nitrogen flow to the furnace at the rate of 1500 cc/min, such supply of nitrogen being continued to purge the atmosphere in the furnace, the furnace being kept at its heated temperature for 600 hours to complete the diffusion of the dopant into the substrate. Diffusion time can be varied between 400 and 1000 hours to provide optimum optical transmission and sheet resistance. The substrate can be removed from the oven to check these parameters and diffusion either terminated or continued, as may be called for. After etching in dilute (10% by volume) hydrofluoric acid to remove all residual SiO2 and phosphate glass from either side of the substrate, the antireflectant coatings (15–22) are then deposited by conventional vacuum evaporation from an electron beam source, using monitoring instruments to measure the rate of deposition and the thickness of deposition. In a typical antireflectant coating for this example, layers 15 and 19 consist of germanium and are 0.073 microns thick; layers 16 and 20 consist of aluminum oxide (Al2O3) and are 0.188 microns thick; layers 17 and 20 are germanium, 0.088 microns thick, and layers 18 and 22 are aluminum oxide (Al2O3), 0.750 microns thick.

GERMANIUM SUBSTRATE

In fabricating a window having a germanium substrate, an N-type dopant such as antimony, arsenic, or phosphorous is deposited upon the surface of a substrate by vacuum evaporation or sputtering. The desired dopant in elemental or non-oxide compound form (e.g. antimony) is first vacuum deposited on the germanium surface to a thickness of five angstroms. The dopant layer is then covered by a protective coating of a material such as silicon or silicon monoxide to a thickness of 500 to 1000 angstroms in a vacuum environment. The doped substrate is then placed in a standard electrically heated diffusion furnace employing a flowing reducing gas mixture of nitrogen or argon and hydrogen (3.5% hydrogen by volume), the furnace being sealed at both ends to exclude the ambient atmosphere as is commonly done in chemical vapor deposition processes. The gas mix passes through a bubbler filled with a low vapor pressure oil at the tube exit to prevent back streaming of the ambient atmosphere. The doped substrate is then diffused for twenty hours in the furnace at a temperature of 750° C. in an atmosphere of a mixture of nitrogen or argon and 3.5% hydrogen by volume.

The electrical and optical characteristics of the finished product are determined by the details of processing, e.g., the amount of dopant deposited, the diffusion temperature, and the diffusion time. For example, with antimony dopant deposited on a germanium wafer to a thickness of five angstroms which is covered by a protective coating of elemental silicon 500 angstroms thick and with the antimony being diffused for twenty hours at 750° C. in an atmosphere of argon having 3.5% hydrogen by volume, an end product is produced having a surface resistance of four ohms/square and a transmissivity of 40% in the 8–12 micron band and 42% in the 3–5 micron band. On the other hand with antimony deposited on a germanium wafer to a thickness of 200 angstroms with identical processing as for the first example, an end product having a surface resistance of 1.5 ohms/square and transmissivity of 30% in the 8–12 micron band is provided.

An example of a method for fabricating an embodiment of the invention utilizing a germanium substrate will now be described in connection with FIG. 5.

EXAMPLE II (Germanium Substrate)

A germanium wafer is used having a thickness of 0.015 inches. A germanium binder layer is deposited by sputtering on one surface of the germanium substrate to a thickness of 500 angstroms. Over this germanium binder layer, an antimony dopant layer of 5 angstroms thickness is then deposited by sputtering. Over the antimony dopant layer a silicon monoxide or elemental silicon protective encapsulant layer is deposited by sputtering to a thickness of 500 to 1000 angstroms. Referring now to FIG. 5, the substrate 51 is then placed in quartz lined furnace 52 which has electrical resistance or inductive heating elements 54. The substrate is supported on a fused quartz boat 56 with the furnace being heated to 400° C. The atmosphere inside the furnace is then purged by feeding nitrogen into the furnace through inlet 52a at 3 liters/minute for a period of thirty minutes. The gas is exited into bubbler 57 wherein to prevent back streaming of the ambient air it is passed to the ambient atmosphere through a low vapor pressure oil, such as diffusion pump fluid. The temperature of the furnace is then raised from 400° C. to 750° C. over a period of thirty minutes, and during this time a gas mixture of nitrogen and 3.5% hydrogen is fed into the furnace at a rate of 1.5 liters/minute. The temperature of the oven is maintained at 750° C. while continuing to feed the nitrogen/hydrogen mixture into the furnace to achieve drive in diffusion of the antimony dopant layer into the germanium substrate. This step is carried on for a period of 16 hours. The furnace is then cooled down from 750° C. to 400° C. over a period of four hours while continuing to feed the nitrogen/hydrogen mixture thereto. With the oven at 400° C., the atmosphere in the furnace is purged by feeding nitrogen at a rate of 1.5 liters/minute for a period of thirty minutes. It is to be noted that in both this and the preceding gas purge steps, that argon can be used in place of nitrogen.

The doped germanium substrate is then removed from the furnace and residual dopant and protective encapsulant material removed from its surface by wet chemical etching, this end result being achieved with a solution composed of ten to fifty percent concentrated hydrofluoric acid, by volume, balance deionized water. The substrate is dipped in this mixture at room temperature and gently agitated until all coating residue is removed from the surface as indicated by visual observation. Following this acid dip, the substrate is rinsed in deionized water and blown dry with dry nitrogen gas. Its electrical sheet resistance is then measured using the four-point probe technique, which is well known in the industry, and its infrared optical transmission is verified with an infrared spectrophotometer covering the appropriate wavelength region.

Both the doped and undoped surfaces of the substrate are then coated with a plurality of anti-reflection coatings 15-22 (See FIG. 1). These anti-reflection coatings are deposited by vacuum evaporation from an electron beam gun source with appropriate optical and accoustical thickness and deposition rate monitoring instrumentation which is well known in the art. Only three layers per surface are employed in this embodiment. Layers 15 and 19 consist of thorium tetrafluoride (ThF4) and are 0.621 microns thick; layers 16 and 20 consist of germanium and are 0.098 microns thick; layers 17 and 21 are thorium tetrafluoride (ThF4), 0.621 microns thick.

Figure 6:
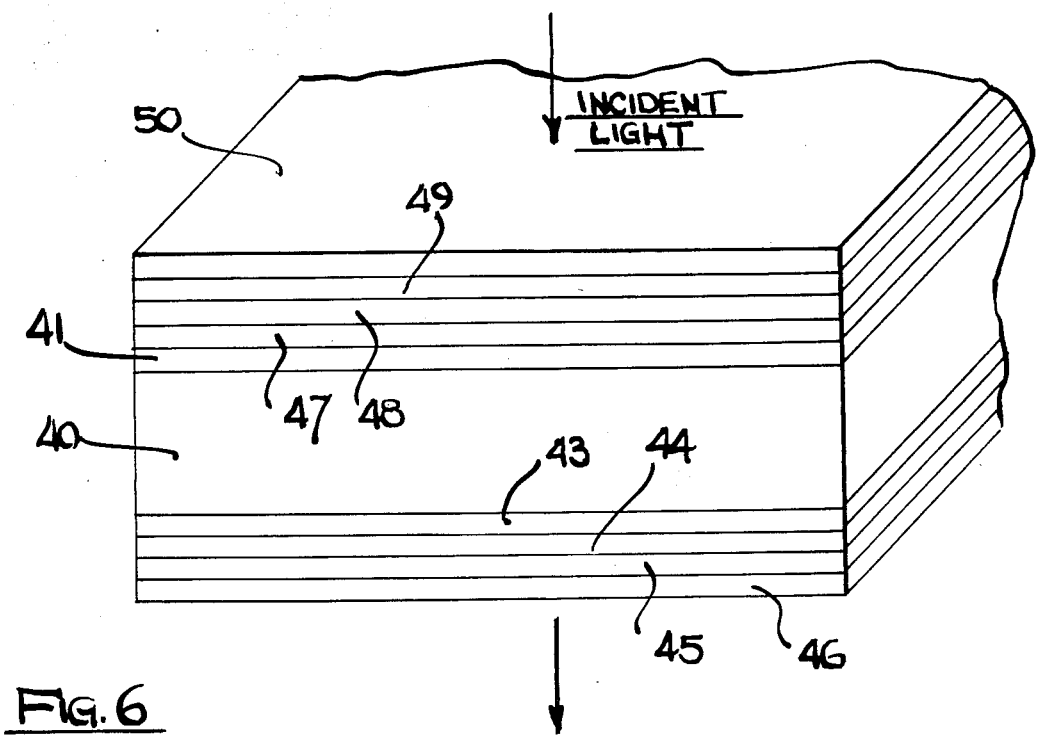
FIG. 6 is a schematic drawing illustrating the third embodiment of the invention.

Referring now to FIG. 6 an embodiment of the invention employing a gallium arsenide semi-insulating substrate 40 is shown. Substrate 40 is typically 0.012 to 0.025 inches thick. In this embodiment a gallium arsenide film 41 is grown on the substrate utilizing metal organic chemical vapor deposition (MOCVD). The epitaxial thickness may be 15 to 50 microns, but is typically 25 microns. Epitaxial deposition by this technique is well known in the art and is described for example on page 324 of *Semiconductor Devices* by S. M. Sze, Published by John Wiley & Sons in 1985. This process in its essence uses sources of trimethylgallium vapor and arsine with hydrogen as a carrier gas. The vapor carried on hydrogen is passed over the gallium arsenide substrate heated in a furnace to 650°-900° C. at which temperatures the vapor and gas decompose. The gallium and arsenic thus produced have high affinity for the gallium arsenide substrate and condense on this substrate, forming a crystal surface structure thereon. The thickness of the deposited layer 41 is determined by the amount of gas flowed over the substrate. Since gallium arsenide in its pure state is not electrically conductive at room temperature, an electrically active dopant, silicon in the form of silane is added to the gas stream during the epitaxial growth of layer 41. The silane is added to the gas stream at a very low flow rate such that the resultant silicon is incorporated into the gallium arsenide on the order of 1 silicon atom for $10^6$ gallium arsenide molecules. In this example, the antireflectant coating consists of only three layers per surface. Referring to FIG. 6, layer 41 is epitaxially grown gallium arsenide, layers 43 and 47 consist of zinc selenide and are 0.177 microns thick, layers 44 and 48 consist of silicon monoxide and are 0.224 microns thick, layers 45 and 49 consist of magnesium fluoride and are 0.315 microns thick, and layers 46 and 50 are absent in this design.

An example of the fabrication of the embodiment of the invention employing a gallium arsenide substrate as described is as follows in connection with FIG. 5.

EXAMPLE III (Gallium Arsenide)

Figure 5:
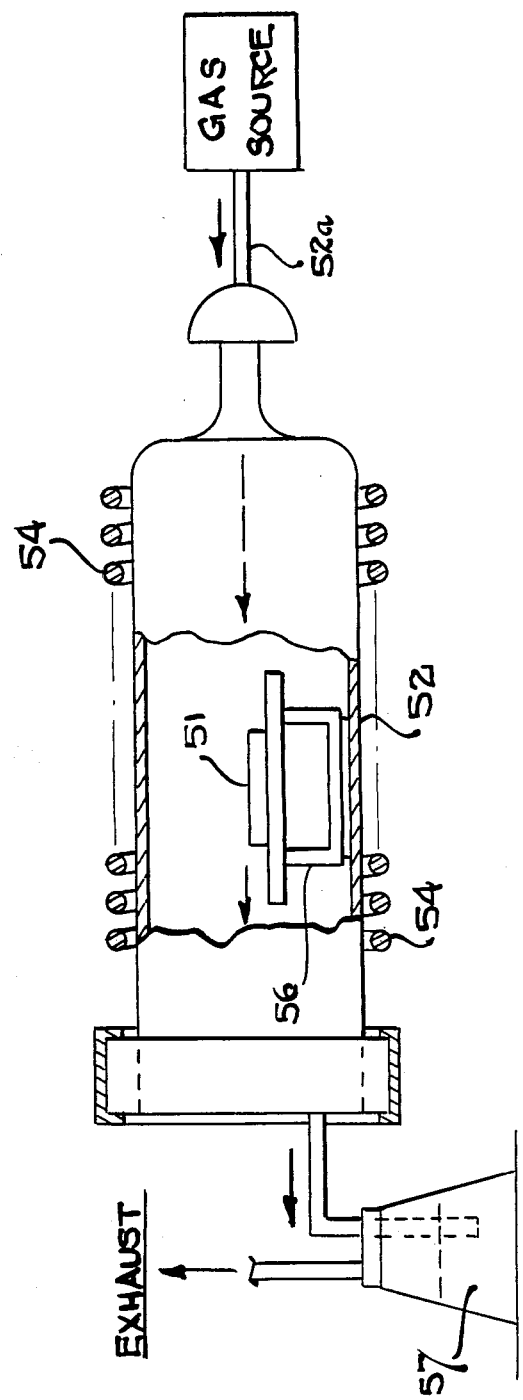
FIG. 5 is a schematic drawing illustrating the fabrication of a second and third embodiment of the invention.

A gallium arsenide wafer 51 having a thickness of 0.017 inches was placed on a silicon carbide coated susceptor 56 in a quartz reaction chamber such as shown in FIG. 5. This chamber is sealed off from the ambient atmosphere and purged by flowing hydrogen at the rate of 6.5 liters per minute for fifteen minutes. The susceptor 56 for the gallium arsenide substrate is then raised to 800° C. by inductively heating the susceptor (using rf power applied through the coil 54) for a period of fifteen minutes with the addition of arsine being flowed through the chamber at the rate of 0.60 liters/min. The vapors of trimethyl gallium at $-12.8°$ C. on a hydrogen carrier flowing at a rate of 0.080 liters/min and silane gas diluted with hydrogen at 40 parts silane to one billion parts hydrogen are flowed through the chamber for a period of one hundred minutes to achieve a 24 micron thick epitaxial layer of gallium arsenide. At the end of this period, the flow of trimethyl gallium vapor and silane on the hydrogen carrier is terminated, the flow of arsine being continued. The furnace is then permitted to cool to room temperature, the flow of arsine being shut off when the temperature reaches 550° C.

The anti-reflectant layers are then applied as for the previous embodiment by conventional vacuum evaporation. In this example, the antireflectant coating consists of only three layers per surface. Referring to FIG. 6, layer 41 is epitaxially grown gallium arsenide, layers 43 and 47 consist of zinc selenide and are 0.177 microns thick, layers 45 and 49 consist of magnesium fluoride and are 0.315 microns thick, and layers 46 and 50 are not employed in this design.

While the invention has been described and illustrated in detail, it is to be clearly understood that this is by way of illustration and example only and is not to be taken by way of limitation, the spirit and scope of the invention being limited only by the terms of the following claims.

We claim:

1. A transparent conductive window for transmission in the infrared comprising:
    a semiconductor substrate transmissive to infrared and having an input surface,
    dopant means forming a doped layer adjacent said surface for rendering said layer conductive,
    said dopant means being distributed into the layer to obtain an electrical resistivity thereat of less than about 10 ohms per square while essentially preserving the optical properties thereof.

2. The window of claim 1 wherein the doped layer has been fabricated by diffusion of an elemental dopant into said substrate surface.

3. The window of claim 1 wherein the doped layer has been epitaxially grown on the surface of said substrate.

4. The window of claim 1 wherein the doped layer has been deposited to a thickness of substantially 25 microns.

5. The window of claim 1 wherein said doped layer is of the N type.

6. The window of claim 1 and further including a plurality of anti-reflectant coatings deposited on the other of the optical surfaces of said substrate.

7. The window of claim 1 wherein the substrate is of silicon and the dopant is of a material selected from the group consisting of antimony, phosphorous and arsenic.

8. The window of claim 1 wherein the substrate is of germanium and the doped layer is of a material selected from the group consisting of antimony, phosphorous and arsenic.

9. The window of claim 1 wherein the substrate is of gallium arsenide and the doped layer comprises a layer epitaxially grown on the substrate.

10. A transparent conductive window for use in the infrared comprising a sheet of semiconductive material having front and back surfaces and selected to be transparent to infrared radiation,
- an N type dopant diffused into said front surface of said semiconductor to a thickness sufficient to give a sheet resistance of less than 10 ohms/square and transmittance at least 75% of that of the undoped substrate, and
- an antireflection coating stack deposited over said dopant surface, said antireflection coating being selected to form an impedance match between air and said doped surface.

11. The transparent window as in claim 10 wherein said semiconductor material is selected from the group consisting of germanium, silicon and gallium arsenide.

12. A transparent conductive window for use in the infrared comprising:
- a sheet made of semiconductor material and having a front surface, said semiconductor material being selected to be transparent to infrared radiation, and
- means forming an impurity zone established into said semiconductor sheet from the front surface to a thickness sufficient to give a sheet resistance of less than 10 ohms/square and transmittance at least 75% of that of pure semiconductor material.

13. An optical window transparent to light energy in the infrared range and having low electrical resistivity comprising:
- a germanium substrate having opposite optical surfaces,
- a doped layer of a material selected from the group consisting of antimony phosphorous and arsenic diffused into one of the optical surfaces of said substrate to a thickness of substantially 25 microns, and
- a plurality of anti-reflectant coatings deposited over said doped layer and over the other of the optical surfaces of said substrate.

14. An optical window transparent to light energy in the infrared range and having low electrical resistivity comprising:
- a silicon substrate having opposite optical surfaces,
- a doped layer of a material selected from the group consisting of antimony phosphorous and arsenic diffused into one of the optical surfaces of said substrate to a thickness of substantially 25 microns, and
- a plurality of anti-reflectant coatings deposited over said doped layer and over the other of the optical surfaces of said substrate.

15. An optical window transparent to light energy in the infrared range and having low electrical resistivity comprising:
- a gallium arsenide substrate having opposite optical surfaces,
- a doped gallium arsenide film epitaxially deposited on one of the optical surfaces of said substrate to a thickness of substantially 25 microns, and
- a plurality of anti-reflectant coatings deposited over said doped layer and over the other of the optical surfaces of said substrate.

16. A conductive window for transmission in the infrared comprising:
- a semiconductor substrate having an input surface transmissive to infrared energy;
- said semiconductor being selected from the group consisting of silicon, germanium, and gallium arsenide;
- dopant means forming a doped layer adjacent said surface for rendering said layer conductive while essentially preserving the optical properties thereof, said semiconductor substrate and dopant means being selected from one of the substrate-dopant pairs consisting of silicon doped with phosphorous; germanium doped with antimony, arsenic, or phosphorous; and gallium arsenide doped with silicon;
- said dopant being distributed into the layer to obtain an electrical resistivity thereat of less than about 10 ohms per square.

* * * * *